United States Patent Office.

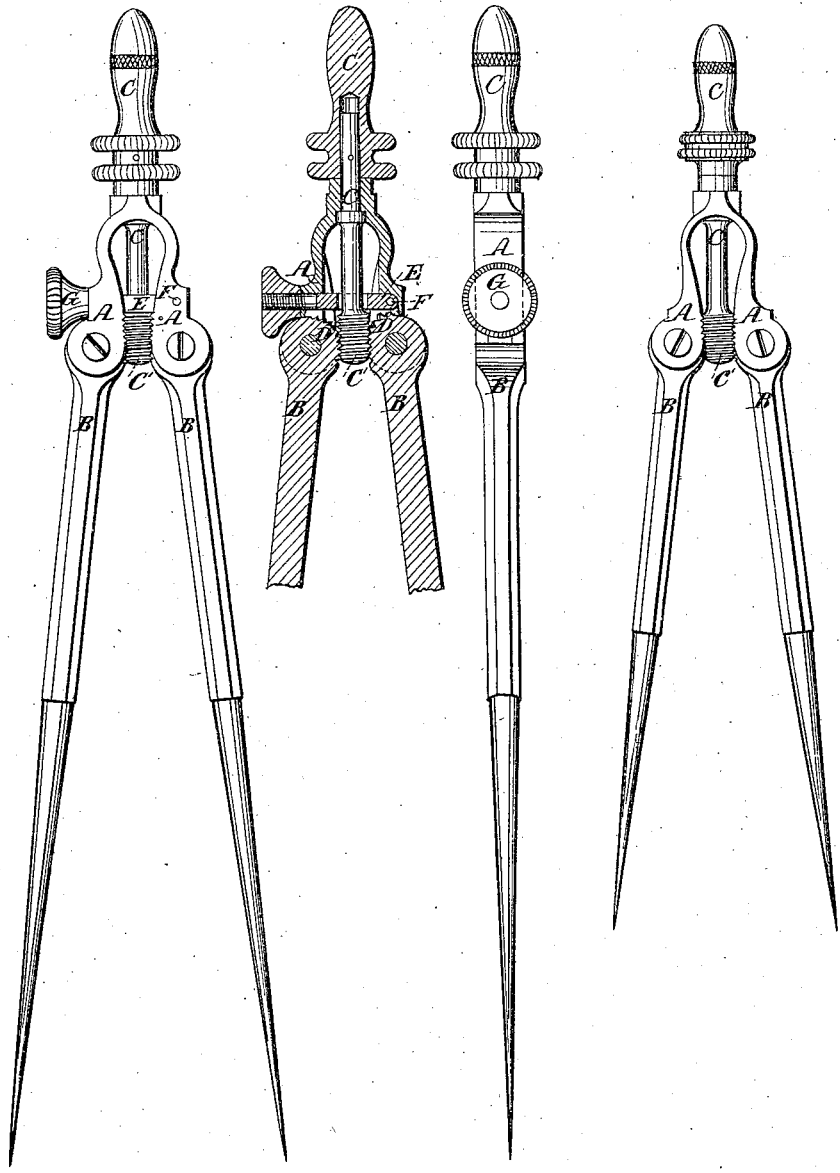

SYLVANUS SAWYER, OF FITCHBURG, MASSACHUSETTS.

*Letters Patent No. 79,603, dated July 7, 1868.*

---

IMPROVEMENT IN CALIPERS.

---

The Schedule referred to in these Letters Patent and making part of the same.

---

TO ALL WHOM IT MAY CONCERN:

Be it known that I, SYLVANUS SAWYER, of Fitchburg, in the county of Worcester, and State of Massachusetts, have invented certain new and useful Improvements in Calipers, dividers, and other similar instruments of precision; and I do hereby declare that the following is a full, clear, and exact description of the same, taken in connection with the accompanying drawings, making a part of this specification, in which—

Figure 1 is a side elevation,

Figure 2 is a vertical section,

Figure 3 is an elevation at a right angle to fig. 1, and

Figure 4 is an elevation of a modification of the improvement, proposed to be used for small instruments.

The subject-matter of my invention relates to the construction of the mechanism for moving and holding the legs of dividers, calipers, and other similar instruments, and is an improvement upon the method employed for such purposes, for which Letters Patent were granted to me, dated April 9, 1867, No. 63,656.

In the mechanism shown in the aforesaid patent, the legs are moved by a screw or worm working between and engaging with toothed sectors attached to the legs, the parts being fixed and held in position by clamping the body of the screw and drawing it sidewise against the concave curves of the sector-gears, while the joint-pins of the legs were held rigidly in a fixed relation to each other.

My invention consists in so constructing the joints of the legs as to be slightly yielding in the direction towards and from each other, and, in combination therewith, the employment of a clamping-screw spring or other suitable means which will force the sector-gears inward upon the screw placed between them, so that the inclined sides of the teeth of the gears and of the threads of the screw wedging into each other will hold all the parts rigidly together in a fixed position.

In the drawings, A is the stock of the instrument, to which the legs B B are jointed, as shown. C is a spindle, having a bearing with suitable collars in the upper part of the stock, the upper end of which forms a handle to the instrument, and is provided with a milled head, by which the spindle is turned. Upon the lower end of the spindle is formed a worm or screw, C', with sharp or V-threads, which engages with two geared sectors, D D, attached to the legs B, as shown. The peripheries of the sectors are hollowed, and provided with sharp spiral teeth, to fit the worm, so that by turning the same the legs are simultaneously opened or closed in a perfectly obvious manner. E is a clamping-rod, one end of which is jointed to one side of the stock A, at F, near one of the joints of the legs, and the other end of the rod passes through a hole in the opposite side of the stock, and is provided with a screw and nut, G, by which the two joints of the legs are drawn toward each other, the form of the stock shown being such as to allow the joints to yield in that direction by the elasticity of the parts.

Through the rod E an opening is made to allow the spindle C to pass through it, as is shown. By setting up the nut G, the sector-gears, the screw, and the stock are firmly clamped together, with the teeth of the gears wedging into the threads of the worm, whereby all looseness of the bearing-surfaces is taken up, and the parts are rigidly confined together in a perfectly obvious manner.

This method of moving and holding the legs is capable of considerable modification in form, while retaining the essential characteristics of my improvement; as, for instance, in the construction of mathematical instruments, so called, when the instrument is light, and does not require to be held with much force, I propose to omit the rod E, and employ the elasticity of the stock itself to force the sectors upon the worm with the required pressure, in which case the pressure upon the gears would be continuous. This form of construction is shown in fig. 4. And instead of the worm-screw and spindle C C' to work in the sectors, a rack with V-shaped or bevelled teeth, which is itself drawn up and down by a screw, might be used, and other modifications of a similar character may be made to embody the same principle.

What I claim as my invention, and desire to secure by Letters Patent, is—

Constructing the joints which connect the legs with the stock, so as to yield in the direction toward and from each other, in combination with the geared sectors, the worm or rack, and the clamping-rod, spring, or other suitable means for clamping the parts together, substantially as described.

Executed, May 5, 1868.

SYLVANUS SAWYER.

Witnesses:
N. C. LOMBARD,
DAVID PRAY.